May 5, 1959 E. C. GREANIAS 2,885,551
VARIABLE VOLTAGE LEVEL DISCRIMINATOR
VARYING WITH THE INPUT VOLTAGE LEVEL
Filed Nov. 30, 1955

INVENTOR.
EVON C. GREANIAS
BY
Dewey J. Cunningham
ATTORNEY

United States Patent Office 2,885,551

Patented May 5, 1959

2,885,551

VARIABLE VOLTAGE LEVEL DISCRIMINATOR VARYING WITH THE INPUT VOLTAGE LEVEL

Evon C. Greanias, Vestal, N.Y., assignor to International Business Machines Corporation, New York, N.Y., a corporation of New York Application November 30, 1955, Serial No. 550,144

1 Claim. (Cl. 250—27)

The present invention relates to signal translating apparatus, particularly such apparatus as is used in handling signals obtained from devices which are scanning graphic data.

While there are a number of methods used in scanning graphic data on a record medium, one of the methods which appears to be the fastest includes the use of a light sensitive device such as a photomultiplier. In such a method, the graphic data, which may be characters in the form of code marks or alphanumeric information, is scanned by means of a suitable scanning apparatus. Such apparatus may be in the form of a mechanical scanner or it may be a cathode ray apparatus such as a "flying spot" scanner or an iconoscope. In any event, some form of light sensitive means must be used to detect gradations of light which result from scanning the character. The output signals from the light sensitive means normally have an instantaneous amplitude which is a function of the amount of light viewed thereby.

A serious limitation in the above type of apparatus is the relatively poor signal which is frequently encountered with low contrast copy. That is, the characters may be anywhere from a dark color which contrasts greatly with the background to a very light color which tends to merge with the background. At other times both the background and characters may vary in density at the same time. In many cases, contrast between the character and its background may be such as to permit an easy distinction to the human eye, but to the light sensitive device, the distinction may be only slight. In order to match the ability of the human eye to detect subtle contrasts, a scanning system such as that under discussion must be equipped to compensate for variations in the general density level of the data. It must, in effect, be able to indicate that character lines are "black" and the background is "white" for overlapping ranges of viewed light.

A common technique for discriminating black and white signals, i.e., those from the character and those from the background, is to establish a discriminating or clipping voltage level which must be exceeded by the analog signal from the light sensitive device when an area of the character is scanned. Unfortunately, a single discriminating level is at most a compromise, and may result in passing too much undesirable data or not enough of the desirable data.

In my copending application for Signal Translating Apparatus, Serial No. 550,024, filed November 30, 1955, there is described an arrangement whereby a discriminator circuit is arranged to receive the video signals and to apply thereto a dynamic discriminating level. The dynamic discriminating level is obtained by an integrating circuit which also receives the video signals and produces as an output a signal which is higher for dark data than it is for relatively light data. Thus, it will be seen that the integrating circuit remembers the past history of the video signals and sets a discriminating level to a present signal accordingly.

In the present invention the video signals are fed to the integrating circuit, which controls the discriminator circuit, as in my copending application, but the video signals are delayed for some predetermined period of time before they are applied to the discriminator circuit. It is therefore possible to look at the video data both ahead and behind a particular video signal for determining the discriminating level to be applied to that signal. An advantage of the present invention is manifested under circumstances where the density of the background is varying from dark to light, or vice-versa, from scan to scan. By looking both ahead and behind the video signal for a particular point in a character, a more accurate discriminating level is achieved for that video signal. One type of scanning which may be used is to scan vertically from the top to the bottom of a character during a scan period with each successive scan being displaced laterally from a preceding scan. Thus, the successive scans can proceed from right to left across the character. Apparatus for performing this type of scanning is illustrated in application Serial No. 478,430 which was filed December 29, 1954, for M. D. Rogers by the assignee of the present invention.

An object of this invention is to provide a new and novel signal translating apparatus for use in conjunction with a device which is scanning graphic data.

Another object of the present invention is to furnish an improved signal translating device for receiving video signals from graphic data scanning means and applying a dynamic discriminating level thereto which is a function of the general density level of the data being scanned.

Still another object of this invention is to provide an improved discriminator circuit for processing video signals produced by mean which scan graphic data, said discriminator circuit being arranged to apply an instantaneous discrimination level to the video signals based on the immediate past as well as the immediate future video signals.

A further object of the invention is to provide a means for distinguishing the video signals produced in scanning, character data from those produced in scanning the character background, the discriminating level to be applied at a particular instant to a video signal for a particular area being determined by the general density level of the neighboring areas both ahead and behind in the scanning process.

Other objects of the invention will be pointed out in the following description and claim and illustrated in the accompanying drawings, which disclose, by way of examples, the principle of the invention and the best mode, which has been contemplated, of applying that principle.

Figure 1:
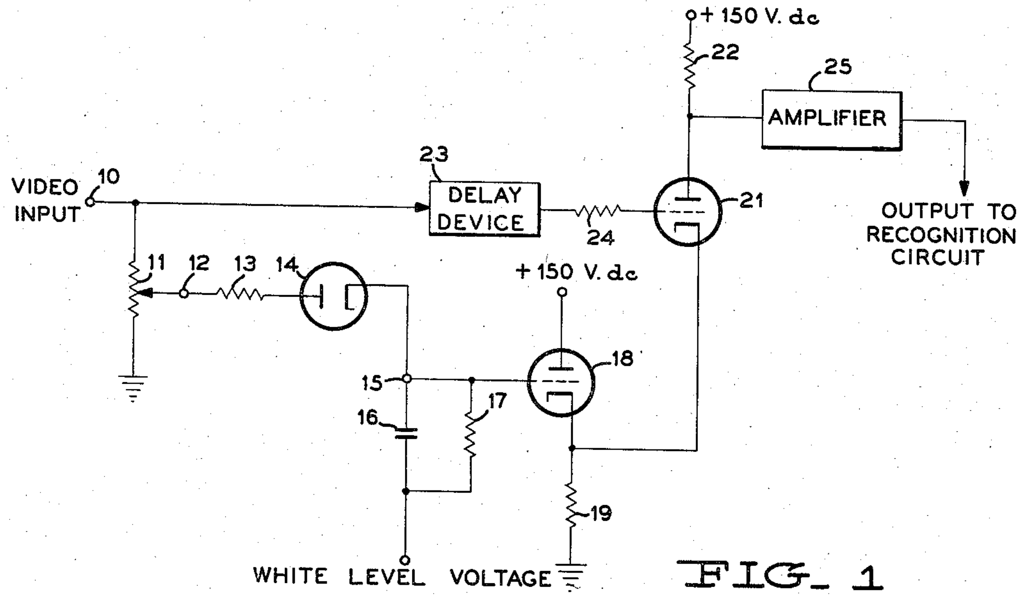
Fig. 1 is a schematic diagram of the present invention.

For a more detailed description of the present inventon reference is made to Fig. 1. The video signals produced by the photomultiplier which scans the graphic data in a prescribed pattern may be suitably amplified and supplied to terminal 10. A potentiometer 11 is connected between terminal 10 and a reference potential, herein illustrated as ground. The slider of the potentiometer is connected to a terminal 12 which serves as the input terminal for a gating circuit comprising resistor 13 and diode 14. As shown, one end of resistor 13 is connected to terminal 12 and the other end is connected to the plate of diode 14, the cathode of said diode being connected to a terminal 15. An integrating circuit is provided which comprises a capacitor 16 having a resistor 17 in shunt therewith, the capacitor being connected between terminal 15 and a source of reference potential, herein referred to as the white level voltage. The white level voltage is that voltage which would exist on the upper side of the capacitor when only background signals are being received. Terminal 15 is also connected to the control grid of a vacuum tube triode which is connected as a cathode follower. The plate of triode 18 is connected to a source of positive D.C. potential, herein illustrated as +150 v. D.C., and the cathode is connected through a resistor 19 to ground.

The potential appearing at the cathode of triode 18 is connected to the cathode of a vacuum tube triode 21, the plate of said triode being connected by means of a resistor 22 to a positive source of D.C. potential, herein illustrated as +150 v. D.C.

Triode 21 serves as the discrimitor circuit for the video signals and the discriminating level is set by the voltage at the cathode of triode 18. In order that the discriminating level for a particular instantaneous video signal may be determined on the basis of immediate past as well as immediate future video signals, a delay device 23 is incorporated between the video input terminal 10 and the control grid of triode 21. A current limiting resistor 24 is incorporated between the delay device and said grid. Delay device 23 may take different forms but one form which is suitable is a properly terminated electromagnetic delay line of the lumped constant or distributed constant type. One such delay line is the F 100 series manufactured by Control Electronics Co., Inc., Huntington Station, New York. Such delay lines can be properly terminated by suitable impedance devices in a manner well known in the art. It is preferable that the delay line used have a bandwidth adequate for good reproduction of the signals which are to be applied thereto, and minimum attentuation compatible with the signal level desired at the output.

The output from the discriminator circuit is taken from the plate of triode 21 and supplied through an amplifier 25 to the recognition circuit.

The operation of the invention, as illustrated in Fig. 1, will now be described in detail. The input signals applied to terminal 10 varies in amplitude as a function of the density of the data being scanned at any instant. If the incremental area being viewed by the photomultiplier is relatively light then the amplitude of the video signal will be low. On the other hand, if said incremental area is relatively dark the amplitude of the video signal will be high. A careful examination of a document containing character data reveals that the density level of the characters as well as the background surrounding the characters varies considerably from one area to another. For example, a document containing a line of characters may have a background density which shades from very dark at the first character to very light at the last character. Similarly, the ink density of the first character may be quite dark and that for the last character may be very light. These gradations may be sensed by the photomultiplier even from one scan to the next. Even though the contrast between the character outline and background density may remain about the same throughout a line of characters, the amplitude level of the background signal for one area may be higher than the amplitude level for a character in another area. Thus, a discriminating level which is suitable for one character may entirely eliminate the signals for another character.

To generate the proper clipping level, the input signals are integrated in a manner now to be described. As long as the video signal appearing at terminal 12 is sufficiently higher in amplitude than the potential at terminal 15 to cause diode 14 to conduct, capacitor 16 will be charged. The rate of charge is determined by the time constant afforded by resistors 13 and 17, as well as capacitor 16. In practice, with typewritten characters, it has been found that this charging path time constant is satisfactory if it is equal to approximately the time it takes to scan across the scan zone twice. The time constant of the discharge path through resistor 17 when diode 14 cannot conduct may be approximately three times greater. This latter time constant affords what may be termed the integrating period memory.

The potential appearing at terminal 15 is coupled by a cathode follower to the cathode of triode 21. The video signals at terminal 10 are delayed by delay device 23 before being supplied to the grid of triode 21. Thus, it is apparent that the clipping level has been determined by signals appearing both before and after the particular signal emerging from the delay device. This makes it possible to compensate the discriminating level for a present video signal on the basis of a change in general density level in the future.

The period of delay used in delay device 23 may be equal to one-half of the integrating period memory, which in the above example was six times the period needed to cross the scan zone. Since the nature of the charge decay in capacitor 16 causes the earliest events in the integrating period to have less effect on the discriminating level than recent events, the period of delay may be made less than one-half of the integrating period for the best balance.

Figure 2:
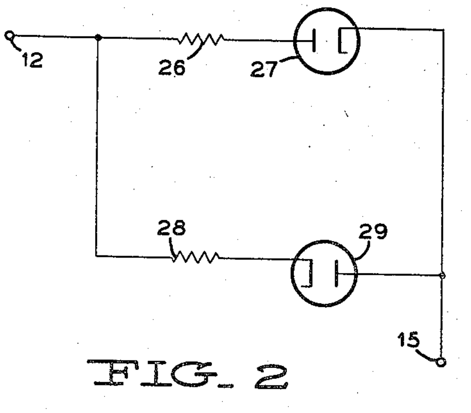
Fig. 2 shows an alternate form of gating circuit which may be used in the present invention.

Fig. 2 shows another form of gating circuit which may be incorporated between terminals 12 and 15 in lieu of resistor 13 and diode 14. The gating circuit of Fig. 2 comprises a forward conducting path including resistor 26 and diode 27 and a reverse conducting path comprising resistor 28 and diode 29. In using the Fig. 2 gating circuit in the Fig. 1 circuit, resistor 17 is made very high so that the charging time constant for capacitor 16 is determined largely by the values of resistor 26 and capacitor 16. The time constant for discharging capacitor 16 is therefore determined largely by the values of resistor 28 and capacitor 16.

The operation of the Fig. 2 gating circuit is such that diode 27 will conduct when the potential at terminal 12 is higher than that at terminal 15 and diode 29 will conduct when the potential at terminal 12 is lower than that at terminal 15. Under these conditions, it will be appreciated that the plate of the diode must be sufficiently higher than the cathode to allow conduction thereof.

Other forms of gating circuits which may be used in the present invention are illustrated in my patent application previously referred to.

From the above-detailed description it will be seen that I have described a discriminating circuit for video signals produced in scanning graphic data which has a dynamic discriminating level applied thereto based on the video signals produced immediately before and after a video signal which is presently being supplied to the discriminating circuit. This allows the discriminating level for a signal produced from scanning one incremental area to be set in accordance with the general density level of neighboring areas.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claim.

What is claimed is:

In a signal translating apparatus which receives video signals from character scanning apparatus, integrating means coupled to receive said video signals and to produce a control signal which is a function of the time integral of said video signals, said integrating means comprising a capacitor having one plate connected to a reference potential and the other plate connected through a first resistor to an input terminal to receive said video signals, asymmetric means connected in series with said first resistor and said other plate of said capacitor for allowing said capacitor to be charged by said video signals only when the potential of said video signals at said input terminal rises above the potential on said other plate of said capacitor, and a discharge path for said capacitor including a second resistor connected directly across said capacitor, the value of said first and second resistors and of said capacitor being selected so that the charging time constant for said integrating means is approximately one-third of the discharging time constant, an amplitude discriminator circuit, and a delay device directly connected to said input terminal to receive said video signals and to reproduce them in substantially their original form after a predetermined time interval approximately equal to one-half of said discharging time constant, said discriminator circuit being connected to said delay device to receive the thus delayed video signals and connected to said other plate of said capacitor to receive said control signal, said control signal determining which of the delayed video signals are of an amplitude capable of causing an output signal from said discriminator circuit.

References Cited in the file of this patent

UNITED STATES PATENTS

| | | |
|---|---|---|
| 2,211,942 | White | Aug. 20, 1940 |
| 2,434,921 | Grieg | Jan. 27, 1948 |
| 2,493,648 | Watton et al. | Jan. 3, 1950 |
| 2,589,807 | Higinbotham | Mar. 18, 1952 |
| 2,609,501 | Guthrie | Sept. 2, 1952 |
| 2,648,766 | Eberhard | Aug. 11, 1953 |